Feb. 3, 1948.  E. A. ROOP  2,435,469
PIPE AND TUBE SHEARING MECHANISM
Filed Oct. 19, 1945  4 Sheets-Sheet 1
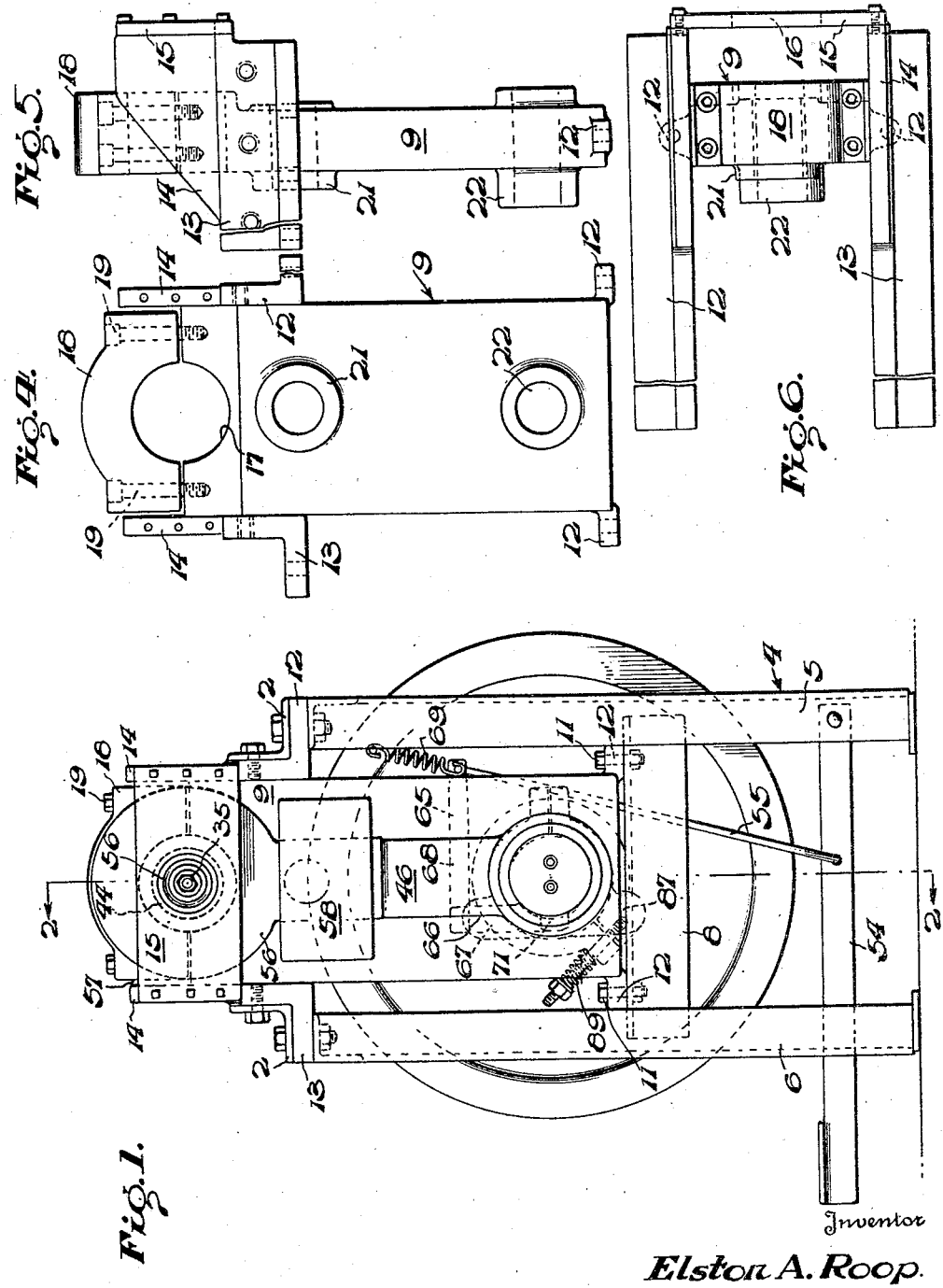
Inventor
*Elston A. Roop.*
By *Arthur F. Robert*
Attorney

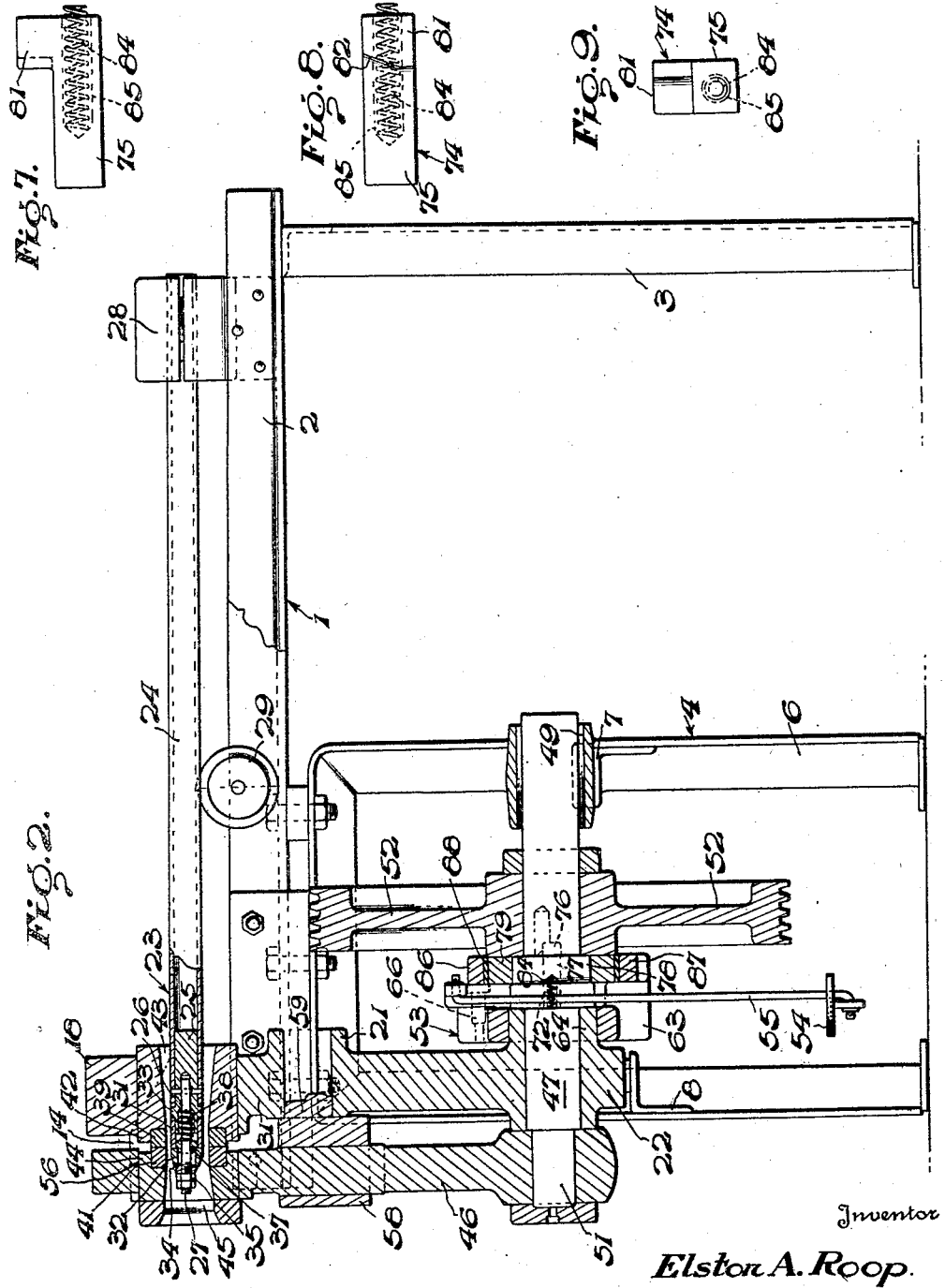

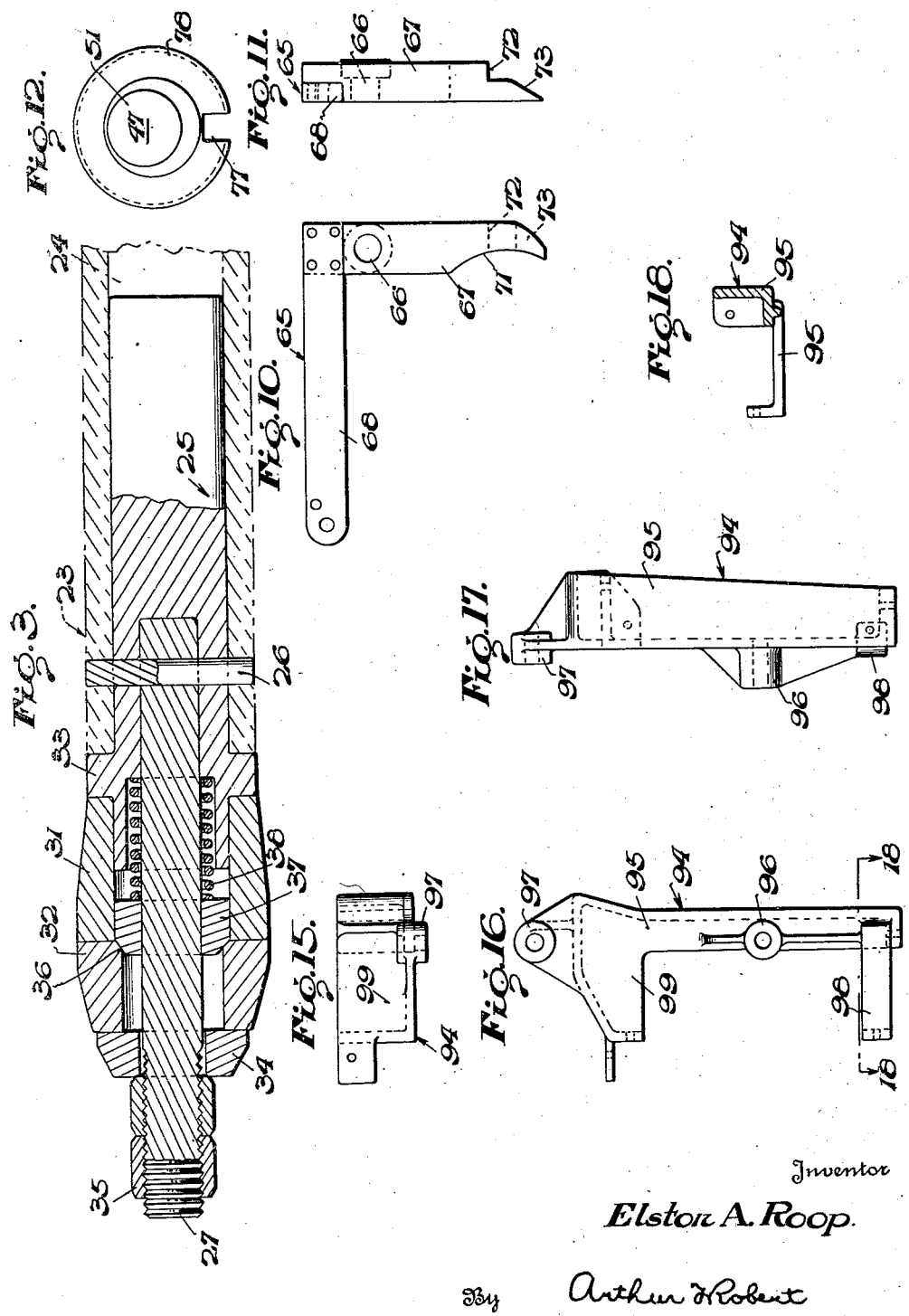

Feb. 3, 1948. E. A. ROOP 2,435,469
PIPE AND TUBE SHEARING MECHANISM
Filed Oct. 19, 1945 4 Sheets-Sheet 4
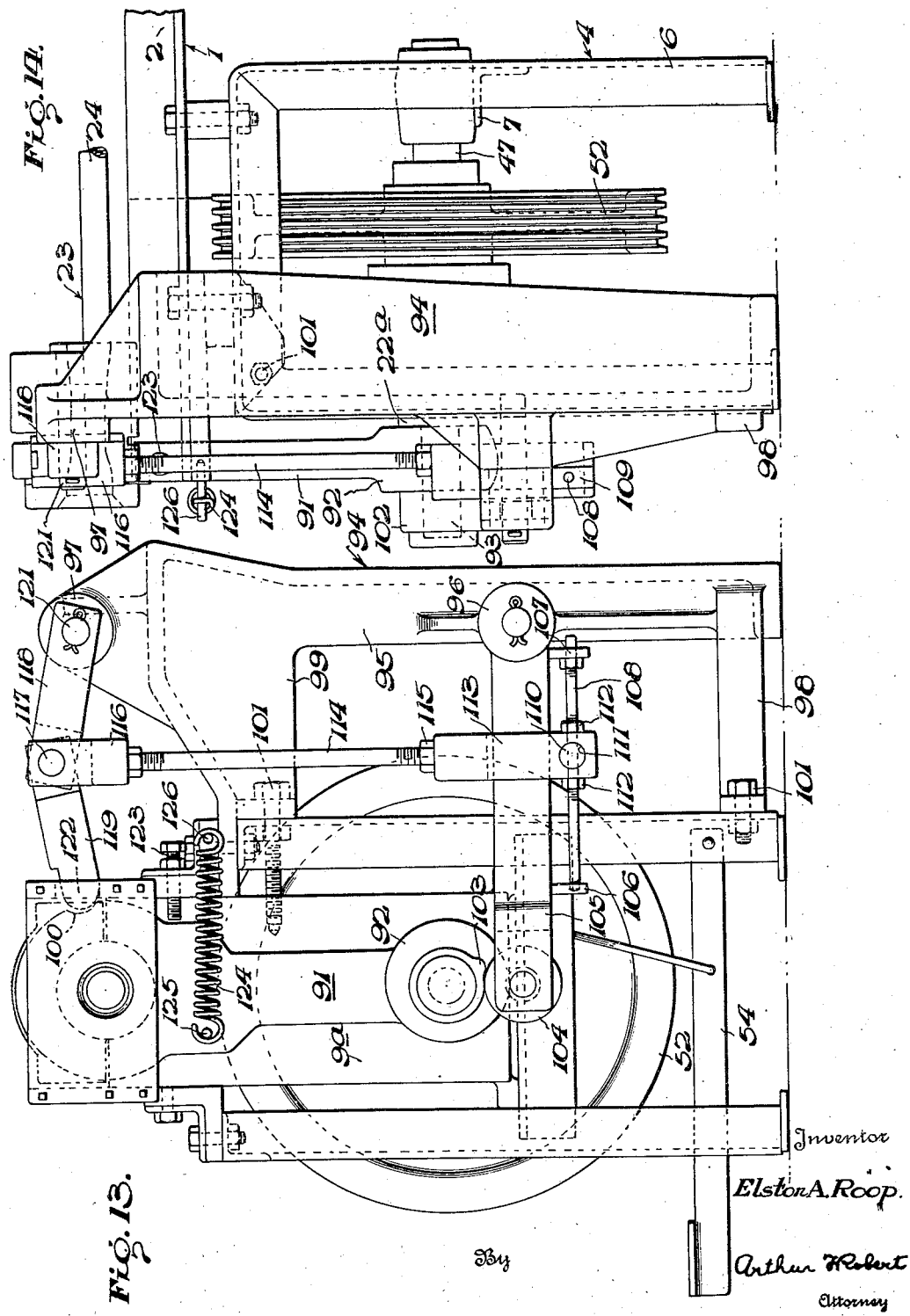
Inventor
Elstor A. Roop.
By
Arthur H. Robert
Attorney Patented Feb. 3, 1948

2,435,469

UNITED STATES PATENT OFFICE 2,435,469

PIPE AND TUBE SHEARING MECHANISM

Elston A. Roop, Louisville, Ky., assignor, by direct and mesne assignments, to J. Edgar Duncan, Detroit, Mich.

Application October 19, 1945, Serial No. 623,239

22 Claims. (Cl. 164—40)

This invention relates to a single-stroke pipe or tube shearing mechanism of the type having a longitudinally extending pipe space and a transverse shearing plane extending across the free or front end portion of the pipe space, a stationary shearing unit composed of a pair of internal and external dies arranged to hold the pipe along one side of the shearing plane and a transversely movable shearing unit composed of a pair of movable internal and external dies, arranged to shear the pipe along the other side of the shearing plane when moved along such plane through a single stroke.

Heretofore the reciprocation of the movable dies has been effected by the ram of a punch press or by some other cumbersome mechanism. As a rule such arrangements are subject to one or more disadvantages or objections such as bulkiness, heavy weight, high manufacturing cost, and hazardous operation.

The principal object of the present invention is to provide a single-stroke pipe-shearing mechanism of the foregoing type which overcomes the foregoing objections and disadvantages and which is compact, light in weight, extremely sturdy, relatively inexpensive to manufacture, and easy and safe to operate.

Another object is the provision of a pipe shearing mechanism wherein shearing strokes in different directions can be applied to a pipe, simultaneously or in such timed relation as best befits the type of pipe being sheared.

A further object is to provide a simplified assembly of internal dies, having a minimum of parts, those parts being essentially rugged and of a character to withstand hard usage and readily susceptible of repair or replacement.

Further objects and advantages will appear from the following description in which Fig. 1 is a front elevation of an embodiment of my invention.

Fig. 2 is a section taken on the line 2—2 of Fig. 1.

Fig. 3 is an enlarged section of the internal die mechanism.

Fig. 4 is a front elevation of the front panel or standard of the assembly of Fig. 1.

Fig. 5 is a side elevation of the panel of Fig. 4 with the front flush plate added.

Fig. 6 is a plan of the panel of Fig. 4 with the front flush plate added.

Figs. 7, 8, and 9 are plan, side elevation, and end elevation, of the clutch key, respectively.

Figs. 10 and 11 are side and end elevations of the bell crank, respectively.

Fig. 12 is an end elevation of the work shaft.

Fig. 13 is a front elevation of a modification of my invention wherein the movable die head is given two movements approximately normal to one another, the clutch and brake mechanism being omitted for the sake of clarity.

Fig. 14 is a side elevation of the assembly of Fig. 13.

Figs. 15, 16, and 17 are plan, front elevation, and side elevation of the auxiliary frame of the assembly of Fig. 13, respectively.

Fig. 18 is a section taken on the line 18—18 of Fig. 16.

The frame underlying the pipe space comprises a longitudinally extending horizontal frame 1 including two laterally-spaced angle iron members 2 arranged to form a horizontal channel extending longitudinally along the underside of the pipe space at an elevation of approximately 30 to 36 inches, the angle iron members being braced laterally by cross pieces as necessary and supported at the rear end of the frame 1 on a vertically disposed angle iron 3.

A box-like standard or frame 4 is provided to support the front end of frame 1. Frame 4 includes two opposite angle members 5 and 6 bent in U-shape with the bight at the top, the legs of the U's constituting the legs of the frame. At the rear, the members 5 and 6 are connected by a horizontal angle member 7 which serves as a bearing support as hereinafter described. The front end of the frame is likewise connected by an angle member 8. A panel 9 of considerable strength is mounted between members 5 and 6 at the front of the frame, the bottom of the panel resting on angle member 8 and secured thereto by bolts 11 extending through lugs 12.

At its upper end (Figs. 4–6, incl.), panel 9 has angle members 12 and 13 secured thereto as by welding or cast integral as a part of panel 9, the horizontal legs of members 12 and 13 being secured between angle iron members 2 of frame 1 and the upper surfaces of frame members 5 and 6 by bolting, welding or similar means.

Side plates 14 extend vertically from the upper surfaces of the vertical legs of members 12 and 13 and are secured to both the legs and the adjacent side of the panel, being cast integral therewith, a flush plate 15 being bolted across the front face of the side plate and suitably apertured at 16 for the reception of the pipe to be sheared.

The upper surface of panel 9 is recessed to form a pocket 17 for a stationary external die head as hereinafter shown, the head being secured therein by a clamping member 18 secured by bolts 19. Panel 9 is also formed with bearings 21 and 22.

The mandrel 23 is composed of a pipe 24 and an arbor 25 rigidly secured in the front end of the pipe by a pin 26, the arbor terminating in a centrally disposed stud 27 projecting axially forward from its front end. The mandrel extends axially through the pipe space with its rear end secured by a clamp block 28 to the rear end of the horizontal frame 1. The arbor at its front end projects through the shearing plane and terminates a short distance beyond the front side of that plane. The mandrel is secured to the mechanism only at its rear end so that a pipe may be placed on or removed from the mandrel over its free front end. The mandrel may be supported on its underside and toward its front end by a pulley wheel 29 mounted on the horizontal frame 1 at a point slightly to the rear of the arbor 25.

The internal dies, hereinafter termed plugs to distinguish from the external dies, mounted on the arbor comprise a stationary ring plug 31 and a transversely movable ring plug 32. The stationary ring plug 31 is positioned along the rear side of the shearing plane and is frictionally mounted firmly upon a seat provided by a shouldered section 33 of the arbor. The movable ring plug 32 is positioned along the front side of the shearing plane and held in abutting end-to-end relationship with ring plug 31 by a shoulder ring 34 slidably mounted on arbor stud 27 and securing nuts 35 threaded on the arbor stud and arranged to press the shoulder ring 34 against movable plug 32. There may be substituted for the stationary and movable internal plugs shown, any of a series of dies or plugs, all having the same inside diameter but presenting different outside diameters over a range corresponding to the range of pipe sizes which the mechanism is capable of cutting.

In accordance with the present invention, the internal die or plug assembly is simplified and arranged to accommodate a wide variety of shearing motions by providing it with a novel arrangement for yieldably holding the movable plug, against transverse movement, in a position of axial alignment with the stationary plug. To this end, the movable plug 32 is provided with an internal conically-shaped cam surface 36 adjacent the shearing plane, while a ring-shaped centering cam 37 is slidably mounted on stud 27 within stationary plug 31 and yieldably urged by a spring 38 against the cam surface 36 of the movable plug. Spring 38 urges the centering cam 37 against cam surface 36 with sufficient force to center the movable plug in axial alignment with the stationary plug so long as the movable plug is free to move. At the same time, the centering cam 37 permits the movable plug 32 to be moved transversely along the shearing plane in any direction. When it is so moved, it forces the centering cam to move axially into the space encompassed by the stationary plug, against the action of spring 38.

The external dies comprise a stationary die 39 and a movable die 41 both preferably in the form of circular ring dies, as shown. Stationary external die 39 is frictionally mounted in a recess in the front end of a cylindrical die holder 42 which contains an axial opening 43 of rearwardly increasing diameter while movable external die 41 is frictionally mounted in a recess in the rear end of a cylindrical die holder 44, which contains an axial opening 45 of forwardly increasing diameter. There may be substituted for the stationary and movable external dies shown, any of a series of dies, all having the same outside diameter but presenting different inside diameters over a range corresponding to the range of pipe sizes which the mechanism is capable of cutting, the maximum size being determined by the minimum diameters of the die holder openings 43 and 45. Both dies 39 and 41 are preferably reversible so that all faces can be used in cutting prior to sharpening or replacement.

The stationary die holder 42 is positioned between the side panels with its axial opening 43 aligned with the pipe space and rigidly secured to the frame by clamp 18 of the front panel.

The movable die holder 44 is positioned between side panels 14 and preferably extends longitudinally with its front face slidably engaging the front face plate 15 while the rear face of its die 41 slidably engages the front face of the stationary die. Die holder 44 is relatively loosely mounted and tends to rotate with each cut thereby continuously changing the cutting face on die 41.

In place of the reciprocating drive member of a punch press or other cumbersome mechanism for reciprocating the movable dies, I mount, upon the box frame 4, a reciprocating drive mechanism which comprises: a reciprocating arm 46 connected to the movable die holder 44, a rotatable work shaft 47 mounted in bearings 22 and 49 and having an eccentric 51 for reciprocating the arm 46 both vertically and sidewise; a powered flywheel 52 for driving the work shaft 47; and a clutch-brake mechanism 53 of the stop motion class which is effective, upon the operation of a foot pedal 54 and linkage 55, to connect the flywheel to the work shaft, rotate the shaft through a single revolution and then disconnect and brake the shaft to a stop at a definite position corresponding to the end of a single revolution or cycle of operation. Eccentric 51 may be formed by positioning the circular front end portion of the shaft somewhat off-center, as shown, or by interposing between the shaft and arm an eccentric bushing.

Reciprocating arm 46 is provided with an axial opening 56 at its upper end to receive and rigidly grip the die holder 44. Where the reciprocating movement of the arm 46 is vertical only, the side faces of arm 46 at its upper end are preferably placed in slidable engagement with the side panels. On the other hand, where the arm also moves sidewise as when an eccentric motion is imparted to its lower end, its side faces should be spaced from the panels sufficient to provide the necessary clearance. In the present case, the arm undergoes some sidewise motion; hence, a clearance 57 is provided between its upper end and the side panels. To guide the upper end of the arm, it is placed in slidable engagement with a guide member 58 which is pivotally secured to the standard by means of a pin 59 integrally secured to the guide 58 and pivotally mounted on the vertical standard in bearing 21.

Powered flywheel 52 is loosely mounted on work shaft 47 and provided with peripheral grooves for receiving the driving belt, not shown, of a suitable continuously rotating driving motor, not shown. In operation this wheel will rotate continuously, whereas the work shaft will rotate through one cycle or single revolution during each of the intermittent intervals it is connected to the flywheel by means of a clutch-brake mechanism 53.

The clutch-brake mechanism includes a split clutch frame 63 mounted on a circular hub 64 of the vertical standard in a manner permitting its angular adjustment about the hub to any of a series of angular positions. A bell crank 65 (Figs. 10 and 11) is pivotally mounted on clutch frame 63 at 66 and formed with a key arm 67 and a pedal arm 68, a spring 69 being secured to the frame and the pedal arm to yieldably urge the crank into the key-retracting position. The key arm is formed adjacent its end with an arcuate section 71, generally shaped to conform to the curved surface about which it fits, the outermost end of the arm being formed with a shouldered portion 72 and a tapered end 73, the surface so formed being substantially transverse of the axis of the shaft assembly.

Referring to Figures 7, 8, and 9, a key 74 is formed with a stem section 75 of sufficient length to engage a recess 76 in the flywheel when released by the clutch mechanism, the key being slidable in a key way 77 within enlarged portion 78 of shaft 47 (Fig. 12), the key way being closed about the periphery of the shaft by a collar 79, press-fitted or otherwise secured to the shaft. A lug 81 is formed with key 74 extending at a right angle thereto, the lug being formed with an angularly disposed cam surface 82.

Link 55 connects the pedal end of the bell crank to the foot pedal 54 in such manner that a momentary depression of the foot pedal moves the bell crank to its key releasing position. When the foot pedal is depressed, the bell crank is rotated clockwise, thus moving the arcuate shaped end of the key arm to the left as viewed in Figure 1 and away from the viewer as viewed in Figure 2. Referring to the latter figure, shoulder or cam 72 on key arm 67 is then removed from contact with cam surface 82 of the key and the key is free to slide to the right into engagement with the flywheel slot under the action of spring 84 mounted in a bore 85 of the key and reacting against hub 64. The foot pedal is immediately released, returning the key arm of the crank to its original position through spring 69. As the key continues its rotation with the flywheel, it travels to a point where its cammed surface 82 engages the pointed end and the cammed surface 73 of the key arm which has returned to its original position under the action of spring 69. The two cam surfaces ride upon one another to force the key to the left against the action of spring 84 and out of engagement with the flywheel, thereby breaking the drive connection.

A split brake band 86 is anchored at 87 to clutch frame 63 in a position to encircle collar 79 fixed to the work shaft 47, a brake lining 88 being carried by the brake band to engage the outer surface of the collar. The brake is adjustable through a spring and nut assembly 89 and, in operation, functions as a drag.

In operation, the clutch brake assembly is adjusted to stop the work shaft at the end of a single cycle or revolution. The split clutch frame 63 is angularly adjusted about the hub 64 to a position such as to cause that single revolution to start and stop at a point corresponding to the axial alignment of the external dies 31 and 32.

With the machine adjusted, a pipe may be thrust rearwardly over the front end of the mandrel until its front end projects through the shearing plane a distance equal to the length of the pipe to be cut. The foot pedal is now momentarily depressed causing the work shaft to be rotated through a single cycle or revolution. During this rotation, the reciprocating arm is driven by the eccentric on the work shaft causing its upper end to move downwardly along one curved path and thence upwardly along another back to its original position. In moving downwardly it forces the external movable die into shearing engagement with the pipe while such movement of the external die effects a similar movement of the internal movable die. As a result the upper half of the pipe is sheared between the movable external die and the stationary internal die while the lower half of the pipe is sheared between the movable internal die and the stationary external die. In addition, the sidewise motion imparted to the movable dies tends also to shear the pipe positively at the junction areas between upper and lower pipe halves. Once the pipe is completely sheared, the severed section will either fall automatically from the free end of the mandrel or will fall from such end when the pipe is moved forwardly to position the next section for the shearing operation. In this connection, a stop, not shown, may be provided to determine the length of each section to be severed.

Figs. 13-18 inclusive illustrate a modification of my invention embodying means for securing a positive transverse shearing action at any desired point during the vertical shearing, this action being particularly desirable when handling thin pipe.

The machine of Figs. 13-18 inclusive is similar in many respects to that of Figs. 1 and 2, the same type of dies and mandrel being used. The movable head in the instant machine is supported and operated by a depending rod 91 joined to an eccentric hub 92 arranged to be driven by an eccentric 93 on work shaft 47. Rod 91 is not supported by any intermediate pivot as in Fig. 1 as it is intended that eccentric 93 impart only a vertical motion thereto. Hence the front panel or standard 9 of Fig. 1 can be replaced by a standard 9a having only a bearing 22a at the bottom.

An auxiliary frame 94 is provided including an upright 95 having a bearing 96 intermediate its length and a bearing 97 on its top surface, a lower horizontally extending leg 98 and an upper horizontally extending leg 99. The auxiliary frame is readily secured to the box frame by bolts 101 or other equivalent means as shown in Fig. 13. Upper bolt 101 is preferably of a length to extend into a correspondingly tapped bore in front panel or standard 9a to impart additional rigidity to the structure.

A cam collar 102 having a cam 103 thereon of desired shape is secured to rotate with shaft 47, the cam being disposed to contact a roller 104 mounted on arm 105 pivoted in bearing 96. Arm 105 has lugs 106 and 107 secured thereto, a threaded rod 108 being secured therebetween to slidably support bored block 109 having clevis pins 111 extending from the sides thereof. Nuts 112 are threaded on rod 108 to enable block 109 to be fixedly positioned at any point along the rod.

Clevis pins 111 engage apertures 110 in the lower arms of a clevis 113 extending about arm 105, the upper end of the clevis being threadedly connected to a rod 114 (and locked by nut 115) which is threadedly connected at its upper end to clevis 116 and similarly locked. Clevis 116 carries a clevis pin 117 engaging the apertured adjacent end of links 118 and 119 and constituting a toggle assembly. Link 118 is pivoted to the side frame by pin 121 in bearing 97 while link 119 has a free end 122 extending in the direction of the movable die head, and seated in a suitably shaped recess 100 of the movable die head.

In operation as arm 105 is moved downwardly under the synchronized action of cam 103, the pivot connection at 117 is also moved downwardly. As the outer end of link 118 is fixed in position, a resultant horizontal movement of considerable force is imparted to the free end 122 of link 119 which operates to move the movable external die to the left. As this action and the action of the vertical rod 91 are dependent on the rotation of shaft 47 on which the cam 103 may be adjusted, the two movements can be adjusted to operate together in any desired timed relation.

To insure the return of rod 91 to its proper position as may be determined by an adjustable stop 123, a tension spring 124 is connected to rod 91 by pin 125 and the frame structure by pin 126.

In the operation of this modification, the pipe is positioned in the mandrel in a position to be sheared and the foot pedal operated to enclutch the assembly for a single cycle of operation. Arm 91 is reciprocated vertically by the eccentric on shaft 47, the cam 103 also operating to expand the toggle assembly and impart transverse movement to the movable die head. Thus the latter may be given positive movements in directions substantially normal to one another and in any desired time relation, depending upon the type of pipe being processed. Preferably the operation is so timed that the movable head is given a horizontal movement followed by a downward movement. The throw of the horizontal movement can be adjusted by varying the position of the clevis block 109 on threaded rod 108.

While reference is made in this specification to the use of the invention for pipe-shearing, it is to be understood that pipe shearing includes the shearing of tubes and similar elements as well as pipe.

Having described my invention, I claim:

1. An internal plug assembly for a pipe-shearing device of the class described, comprising: a pipe-space mandrel member; front and rear internal pipe-shearing plugs mounted on the mandrel member in abutting end-to-end relation for related transverse pipe-shearing movement from an axially aligned position to an axially offset position; and resilient means arranged to move axially of the mandrel and continuously operative to urge the plugs toward and yieldably hold the plugs in axial alignment.

2. The assembly of claim 1 wherein the resilient means permits radial displacement of the plugs in any direction from an axially aligned position.

3. An internal plug assembly for a pipe-shearing device of the class described, comprising: a pipe-space mandrel member; front and rear internal pipe-shearing plugs mounted on the mandrel member in abutting end-to-end relation for related transverse pipe-shearing movement from an axially aligned position to an axially offset position; a slidable sleeve in one of the plugs having a frustro-conical face arranged to continuously engage the adjacent edge of the walls of an aperture in the opposite plug and urge the latter plug toward and yieldably hold it in axial alignment with the plug containing the sleeve.

4. An internal plug assembly for a pipe-shearing device of the class described, comprising: a pipe-space mandrel member; a rear internal pipe-shearing plug mounted on the mandrel and having an axial bore; a slidable sleeve in the bore having a frustro-conical cam surface formed on the front end thereof and symmetrical with the plug axis; a front internal pipe shearing plug mounted on the mandrel and having an axial bore and a cooperating cam surface at the rear end thereof; means mounting the plugs on the mandrel with their open ends in abutting end-to-end relationship for relative transverse pipe-shearing movement; and means continuously resiliently forcing said frustro-conical cam surface of said sleeve into engagement with said cooperating cam surface of said front plug to urge the plugs toward and yieldably hold them in axial alignment.

5. The assembly of claims 4 wherein the bore in the second plug is of less diameter than that in the first plug.

6. An internal plug assembly for a pipe shearing device of the class described, comprising: a pipe-space mandrel member; an axial stud projecting from the mandrel member; a rear internal pipe-shearing plug mounted on the mandrel having an axial bore surrounding the stud; a collar secured to the stud opposite the open end of the rear plug; a front plug with an axial bore of less diameter than the bore of the rear plug mounted on the stud and secured between the collar and the front face of the rear plug; a sleeve member having a frustro-conical front end symmetrical with the axis of the mandrel member and mounted within the rear plug and slidable therein in a manner whereby the front edge is arranged to engage the adjacent edge of the bore in the front plug and axially align the front and rear plugs; and means to resiliently maintain the sleeve in contact with the front plug whereby the front plug can be axially offset in any direction relative to the rear plug.

7. A single-stroke pipe-shearing mechanism of the type having a longitudinally extending means providing a pipe space and a transverse shearing plane extending across the face or front end portion of the pipe space, comprising: a box-like frame; a support extending to the rear of the frame; a mandrel member arranged to support the pipe to be secured and mounted on the support and extending over the box-like frame, the mandrel including a pair of internal plugs normally in axial alignment with one another above the frame; a stationary external die mounted on the frame with its cutting face in alignment with the cutting face of one of the plugs; a rod slidably and pivotally mounted on the frame at a point intermediate its length; a movable external die supported on one end of the rod at a point removed from the pivot with its cutting face in alignment with the cutting face of the second plug; and means on the frame to impart an eccentric motion to the opposite end of the rod to produce a shearing action by the dies.

8. The assembly according to claim 7 wherein drive means for the rod is provided on the frame; and means is provided to disconnect the rod from the drive means at the conclusion of a single shearing cycle.

9. The assembly according to claim 7 including a shaft mounted on the lower portion of the frame; an eccentric on the shaft mounted to drive the rod; drive means for the shaft; a clutch on the frame between the drive means and the shaft; and means to operate the clutch to connect the drive means, the clutch including means to effect its disengagement at the conclusion of a single shearing cycle.

10. A single-stroke pipe-shearing mechanism of the type having a longitudinally extending means providing a pipe space and a transverse shearing plane extending across the face or front end portion of the pipe space, comprising: a box-like frame; a support extending to the rear of the frame; a mandrel member arranged to support the pipe to be sheared and mounted on the support and extending over the box-like frame, the mandrel including a pair of internal plugs normally in axial alignment with one another above the frame; a stationary external die mounted on the frame with its cutting face in transverse alignment with the cutting face of one of the plugs; a rod guide pivoted on the front of the frame; a rod in the guide having an opening at its upper end; a movable external die in the opening with its cutting face in transverse alignment with the cutting face of the second plug; a work shaft mounted to rotate on the lower end of the frame; and means including an eccentric to connect the shaft to the lower end of the rod to impart an eccentric movement to the movable external die.

11. A single-stroke pipe-shearing mechanism of the type having a longitudinally extending means providing a pipe space and a transverse shearing plane extending across the face or front end portion of the pipe space, comprising: a supporting frame; a mandrel member on the frame arranged to support the pipe to be sheared and including a pair of internal plugs; a stationary external die mounted on the frame with its cutting face in alignment with the cutting face of one of the internal plugs; a movable die having its cutting face in alignment with the cutting face of the other internal plug; means to move the movable die in a transverse direction through the shearing plane in a predetermined direction; and means to move the movable die through the same shearing plane in a direction substantially normal to the direction of the first movement.

12. The assembly of claim 11 wherein means is provided to synchronize the two movements.

13. A single-stroke pipe-shearing mechanism of the type having a longitudinally extending means providing a pipe space and a transverse shearing plane extending across the free or front end portion of the pipe space, comprising: a supporting frame; a mandrel member on the frame arranged to support the pipe to be sheared and including a pair of internal plugs; a stationary external die mounted on the frame with its cutting face in alignment with the cutting face of one of the internal plugs; a movable die; a drive rod arranged to support the movable die with its cutting face in alignment with the cutting face of the second internal plug; means to impart a reciprocating motion to the drive rod and movable die head including a work shaft; and means driven by the work shaft to impart a positive reciprocating movement to the movable head in a direction approximately normal to the reciprocating movement of the drive rod.

14. The assembly of claim 13 including a toggle mechanism adjacent the movable die head; means to secure the outer end of one toggle link to the frame, the other toggle link being arranged to contact the movable die head on expansion of the toggle and impart movement thereto.

15. The assembly of claim 13 wherein the last-mentioned drive means includes a toggle mechanism arranged to move the movable die head in one direction and a spring disposed to return the movable die head to an original predetermined position.

16. The assembly of claim 13 wherein the last-mentioned drive means includes a toggle mechanism to move the movable die head in one direction, a spring arranged to return the head in the opposite direction, and an adjustable stop to determine the point of halt in the return direction.

17. The assembly of claim 13 including means to adjust the timed relation of the movements of the movable die head.

18. The assembly of claim 13 including means to adjust the extent of movement of the movable die head by the last-mentioned means.

19. A single stroke pipe-shearing mechanism of the type having a longitudinally extending pipe space and a transverse shearing plane extending across the free or front end portion of the pipe space, comprising: a supporting frame including a plurality of angle members formed in U-shape with the bights upward whereby the depending arms constitute supporting legs for the frame; a panel mounted between the angle members at the front of the frame; a mandrel member arranged to support the pipe to be sheared and including a pair of internal plugs; means to support the die end of the mandrel above the supporting frame; a stationary external die mounted on the panel with its cutting edge in alignment with the cutting edge of one of the internal plugs; a movable die; means to support the movable die with its cutting face in alignment with the cutting face of the second internal plug, including, a rod mounted in pivotal sliding relation on the panel; and drive means mounted on the frame and panel to impart an eccentric movement to the rod and movable die head.

20. A single stroke pipe-shearing mechanism of the type having a longitudinally extending pipe space and a transverse shearing plane extending across the free or front end portion of the pipe space, comprising: a supporting frame including a plurality of angle members formed in U-shape with the bights upward whereby the depending arms constitute supporting legs for the frame; a panel mounted between the angle members at the front of the frame; a mandrel member arranged to support the pipe to be sheared and including a pair of internal plugs; means to support the die end of the mandrel above the supporting frame; a stationary external die mounted on the panel with its cutting edges in alignment with the cutting edge of one of the internal plugs; means to support the movable die with its cutting face in alignment with the cutting face of the second internal plug, including, a rod; means to support the rod on the panel and frame and impart a reciprocating movement thereto causing the movable die head to move in a predetermined direction in the shearing plane; an auxiliary frame extending from one side of the supporting frame; a toggle assembly mounted on the auxiliary frame with one end secured to the frame and the opposite end arranged to contact the movable die head and move it in a direction substantially normal to the direction of movement imparted by the rod; and means to operate the toggle assembly in timed relation with the rod.

21. An internal plug assembly for a pipe shearing device of the class described comprising a pipe-space mandrel member, front and rear internal pipe shearing plugs mounted on the mandrel member in abutting end-to-end relation for relative transverse pipe shearing movement from an axially aligned position to an axially offset position, an element slidably mounted in one of said plugs and having an operative connection with the other of said plugs whereby movement of the latter from a position of axial alignment with said one of said plugs effects a corresponding axial movement of said element, and resilient means effective to continuously maintain said operative connection to thereby urge said plugs toward and yieldably hold them in axial alignment.

22. An internal plug assembly for a pipe shearing device of the class described comprising a pipe-space mandrel member, front and rear internal pipe shearing plugs mounted on the mandrel member in abutting end-to-end relation for related transverse pipe shearing movement from an axially aligned position to an axially offset position, an element mounted in one of said plugs and having a frusto-conical cam surface formed thereon, the other of said plugs having a cooperating cam surface formed thereon adapted for engagement by said frusto-conical cam surface of said element, and resilient means continuously maintaining said cam surfaces in engagement, said cam surfaces being disposed at less than a wedging angle to permit said other of said plugs to be moved from a position of axial alignment with said one of said plugs without moving said element out of engagement with said other of said plugs.

ELSTON A. ROOP.

REFERENCES CITED

The following references are of record in the file of this patent:

UNITED STATES PATENTS

| Number | Name | Date |
| --- | --- | --- |
| 2,038,255 | Worthington | Apr. 21, 1946 |